United States Patent
Kimura

(10) Patent No.: US 7,426,671 B2
(45) Date of Patent: Sep. 16, 2008

(54) RE-TRANSMISSION CONTROLLING METHOD AND WIRELESS COMMUNICATION TERMINAL APPARATUS

(75) Inventor: Ryo Kimura, Chiba (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 486 days.

(21) Appl. No.: 11/105,426

(22) Filed: Apr. 14, 2005

(65) Prior Publication Data
US 2005/0243743 A1    Nov. 3, 2005

(30) Foreign Application Priority Data
Apr. 30, 2004  (JP) .............................. 2004-136283

(51) Int. Cl.
*H04L 1/18* (2006.01)
(52) U.S. Cl. .................. 714/748; 714/751; 714/18; 370/394
(58) Field of Classification Search ................ 714/748, 714/751, 18; 370/394
See application file for complete search history.

(56) References Cited

U.S. PATENT DOCUMENTS

| | | | |
|---|---|---|---|
| 6,163,861 A * | 12/2000 | Yoshioka et al. ............ | 714/712 |
| 7,003,710 B2 * | 2/2006 | Tomaru et al. .............. | 714/751 |
| 7,187,677 B2 * | 3/2007 | Torsner et al. .............. | 370/394 |
| 2003/0131124 A1 * | 7/2003 | Yi et al. ..................... | 709/236 |
| 2003/0147371 A1 * | 8/2003 | Choi et al. .................. | 370/341 |
| 2003/0210669 A1 * | 11/2003 | Vayanos et al. ............ | 370/335 |
| 2004/0037224 A1 * | 2/2004 | Choi et al. .................. | 370/235 |

FOREIGN PATENT DOCUMENTS

| | | |
|---|---|---|
| EP | 1 326 388 A2 | 7/2003 |
| WO | WO 2004/015906 A2 | 2/2004 |

* cited by examiner

*Primary Examiner*—Shelly Chase
*Assistant Examiner*—Esaw T. Abraham
(74) *Attorney, Agent, or Firm*—Oblon, Spivak, McClelland, Maier & Neustadt, P.C.

(57) ABSTRACT

A re-transmission controlling method and a wireless communication terminal are provided to prevent a transitional high-load state on the data receiving side in a wireless transmission system employing the HSDPA method, for example. In the case where a correct data packet has been determined based on a result of error-correction decoding of a data packet received, the correct data packet is disassembled into predetermined data units and are sent to an upper layer; and when the packet sequence number of a correct data packet received is not continuous, after the received data packet having a discontinuous number is disassembled into the predetermined data units to be sent to the upper layer, the data disassembled into the data units are temporarily stored, and the temporarily stored data is sent to the upper layer without applying disassembly processing when the missing correct data packet due to the discontinuity is received.

7 Claims, 7 Drawing Sheets

RE-TRANSMISSION CONTROLLING METHOD AND WIRELESS COMMUNICATION TERMINAL APPARATUS

CROSS REFERENCES TO RELATED APPLICATIONS

The present invention contains subject matter related to Japanese Patent Application JP 2004-136283 filed in the Japanese Patent Office on Apr. 30, 2004, the entire contents of which being incorporated herein by reference.

BACKGROUND OF THE INVENTION

1. Field of the Invention

The present invention relates to a re-transmission controlling method applied to wireless transmission processing which executes re-transmission control and a wireless communication terminal which executes the re-transmission controlling processing, and to a technology suitable to be applied to data reception in a wireless communication terminal of the HSDPA method, for example.

2. Description of the Related Art

In the past, channel encoding (error-correction encoding), automatic repeat request (ARQ) and the like have been known as a technique to correct errors in wireless transmission applied to wireless telecommunication and so on. On the other hand, a technology called HARQ (Hybrid ARQ) in which an error-correcting function is incorporated has been developed, because packet errors caused by measurement errors, controlling delays or the like are inevitable when applying adaptive modulation/demodulation and error correction coding performed to improve throughput by selecting the optimum modulation method and encoding method depending on the state of a propagation path.

The HARQ is a re-transmission technique of performing in a physical layer a known ARQ-based re-transmission technology which has been provided in an upper layer of a wireless protocol and the like, in which an error-correcting function is combined to perform the re-transmission. Hence, the reliability of data supplied from a physical layer to an upper layer can be improved. In the ARQ that is a re-transmission technology of an upper layer, data which has not been received correctly is discarded and data to be re-transmitted is awaited in general, whereas in the HARQ, data which has not been received correctly is preserved as pre-decoding data of an error correction apparatus and is combined with re-transmitted data to be decoded. Combining data which has not been received correctly with re-transmitted data makes the likelihood showing the reliability of data improved, and increases the possibility of success in decoding.

Here, an example of wireless data communication to which the HARQ is applied is explained. As wireless data communication to which the HARQ is applied, High Speed Downlink Packet Access (hereinafter called HSDPA) method is, for example, proposed in which the high-speed downlink data transmission is executed in Universal Mobile Telecommunications System (UMTS system) that is a system to which W-CDMA is applied.

In the HSDPA method, protocol data units (hereinafter called PDU) correctly decoded using the HARQ function are rearranged in order of the transmission sequence number (hereinafter called TSN) included in header information of a PDU, and are transferred to an upper layer protocol. The HARQ processing and TSN rearrangement function before transferring data to the upper layer are executed in an MAC (Medium Access Control) layer. Further, protocol data units (PDUs) in the MAC layer are called MAC-PDUs. The MAC-PDUs include a MAC-hs PDU of a portion relating to the HSDPA method and a MAC-d PDU for a separate data transmission channel (DCH) existing in the W-CDMA system before introducing the HSDPA method, and the MAC-hs PDU includes a plurality of MAC-d PDUs.

Details of layer structure in the HSDPA method will be described in detail in an embodiment explained later on. In Non-patent Literature 1, communication standards in this HSDPA method are described in detail.

FIGS. 1A to 1E are diagrams showing relationships among protocol data units (PDUs), that is, among MAC-hs PDU, MAC-d PDU and RLC PDU in this HSDPA method. Transmission data supplied as shown in FIG. 1A is divided into data segments by a predetermined data amount as shown in FIG. 1B, and an RLC (radio link control) header is added to each data segment. The RLC header portion includes an SN (sequence number) value with which to rearrange RLC PDUs (RLC protocol data units) in order. Data to which the RLC header is added is sent as RLC PDU to a MAC-d layer and then a MAC header is added thereto as shown in FIG. 1C.

Data to which the MAC header added is sent as a MAC-d PDU (MAC-d protocol data unit) to a MAC-hs layer. Then a MAC-hs header is added by predetermined units as shown in FIG. 1D. Further, as shown in FIG. 1E, the resulted data is made into a MAC-hs PDU (MAC-hs protocol data unit), and is sent to a lower layer (transport channel layer) in which transmission processing is applied thereto. When receiving data, processing in the reverse direction to the flow from FIGS. 1A to 1E is executed to determine data units in each protocol from the data obtained from the transport channel layer, and the data shown in FIG. 1A is extracted.

FIGS. 2A to 2F are diagrams showing an example of communication states in accordance with the HARQ function proposed in the HSDPA method, which is a re-transmission technology incorporating an error-correcting function. FIG. 2A shows a transmission state of data packets (HS-PDSCH) at a base station, and FIG. 2B shows a reception state of data packets (HS-PDSCH) at the base station. The packet received here at the base station is either acknowledge signal (Ack signal) or negative acknowledge signal (Nack signals) from a terminal. The acknowledge signal (Ack signal) is a signal returned upon reception of a relevant packet having no data error on the side of a terminal, while the negative acknowledge signal (Nack signal) is a signal returned upon reception of a relevant packet having data errors.

A signal transmitted from the base station is received at a terminal as shown in FIG. 2C. The number shown in each packet in FIGS. 2A and 2C is a sequence number (TSN) as a number given to a packet. As shown in FIG. 2E, in a HARQ function unit in an MAC-hs layer, an error check (what is called a CRC check) using an error detecting code is performed on the data received at the terminal. When it is judged in this check that no error exists, an Ack signal is generated. On the contrary, when it is judged that there is an error, A Nack signal is generated.

Packets judged to have no error in the CRC check are sent to a reordering function unit in the MAC-hs layer as shown in FIG. 2F. Packets judged to have no error in the CRC check are discarded. Further, the Ack signals and Nack signals generated are transmitted from the terminal as shown in FIG. 2D and are received at the base station as shown in FIG. 2B.

Wireless transmission is executed as described above; and if, for example, packets of TSN=3, 4, 5 . . . are transmitted and an error is detected in the CRC check on the packet of TSN=5 as shown in FIG. 2E, a Nack signal is generated and is sent to the base station. When the Nack signal is detected in the base station and the same packet is ready to be re-transmitted, the same packet (packet of TSN=5 in this example) is re-transmitted as shown at the end on the right side in FIG. 2A. By the time the packet of TSN=5 ready to be re-transmitted, subsequent packets (packets of TSN=6, 7 in this example) to the packet of TSN=5 have been transmitted.

Therefore, on the terminal side, the packets of TSN=6, 7 subsequent to TSN=5 have been received before a correct packet of TSN=5 is again received, and rearrangement in the order of TSN is executed in the reordering function unit within the MAC-hs layer shown in FIG. 2F.

FIG. 3 is a diagram showing on a time line an example of processing in respective function units in a MAC-hs layer in related art, and the example in which a reception error has occurred to the packet of TSN=5 shown in FIG. 2. As shown in FIG. 3, a MAC-hs layer includes a HARQ function unit executing re-transmission controlling processing as described above and a reordering unit in which packets are reordered. Further, the MAC-hs layer shown in FIG. 3 includes a disassembly unit in which packets reordered in the correct order in the reordering unit are disassembled into data units to be dealt with in the MAC-d layer that is the next layer, and the data disassembled in the disassembly unit is sent to the MAC-d layer (at the top of FIG. 3). The disassembly processing in this disassembly unit is equivalent to the processing of disassembling the MAC-hs PDU shown in FIG. 1E into the MAC-d PDUs shown in FIG. 1D. At the time of this disassembly processing, the MAC-hs header shown in FIG. 1D is removed.

Processing in FIG. 3 is explained. As long as correctly received packets continue to be detected in the HARQ function unit shown at the bottom of FIG. 3, the reordering unit performs no processing of rearrangement and sends packets to the disassembly unit without rearranging. The disassembly unit disassembles each of the packets sent thereto, and then sends the results to the MAC-d layer which is the next (upper) layer. Specifically, the packets of TSN=3, 4 are, for example, directly sent to the disassembly unit to be disassembled, and then are sent to the MAC-d layer.

Then if the packet of TSN=5 is detected to have an error in the CRC check, received packets subsequent thereto are stored in a buffer within the reordering unit until the packet of TSN=5 is re-transmitted. Specifically, the MAC-hs PDUs of TSN=6, 7 are accumulated in memory areas secured by each timing of supplying a packet, and are temporarily stored. Then, upon re-transmitting the packet of TSN=5, the packets of TSN=6, 7 are read from the memory and are reordered in the correct packet order to be sent to the disassembly unit.

In the disassembly unit, after a delay of approximately an interval of the temporary storage in the memory, the disassembly processing is resumed starting from the packet of TSN=5, and the disassembled packets are sent to the MAC-d layer. With the processing as described above, correct reception data without an error is supplied to the MAC-d layer in the correct order.

[Non-patent Literature 1] 3GPP TS 25.321 Medium Access Control protocol specification (ver. 5.4.0 published in March 2003 3GPP)

As shown in FIG. 3, in the case where the TSNs of received packets stop continuing, the reordering unit within the MAC-hs layer accumulates received data in the buffer memory; and then when continuity is maintained using the data accumulated in the buffer, the received data accumulated are sent to an upper layer through the disassembly unit. Hence, in the case where this kind of processing is executed in a processor such as a CPU, a problem of a temporary high-load state occurs when a reception error occurs.

In particular, when continuity of received data becomes secured and data stored in the buffer are read, a large amount of data is sent to the disassembly unit at a time and processing of disassembling packets and processing of sending the results thereof to the MAC-d layer are intensively executed, with the result that a load to a processor constituting such layer temporarily becomes extremely high, which is a problem.

Further, in the HSDPA method, since the buffer used in the reordering unit is defined by the sum of the capacity thereof and a buffer capacity used in the RLC layer, it is desirable that memory actually used be dynamically secured. However, when securing the memory in a dynamic manner by means of a system call of a real-time OS or the like, since the amount of processing is relatively large, executing this kind of processing upon receiving each data will be considerable load on a processor.

With respect to this kind of high-speed packet transmission processing such as the HSDPA method, the amount of data (MAC-hs PDU size) dealt with at a time is extremely large, and therefore there is a possibility that throughput be deteriorated due to the reason of a transitional high load on a processor. Hence, it is important to prevent a transitional high-load state by dispersing a load to the processor as much as possible, however, countermeasures against that state have not been satisfactorily provided in the past.

Further, the amount of data temporarily stored in the buffer is also considerably large, so that reduction thereof is desirable.

SUMMARY OF THE INVENTION

The present invention is made in light of the above points, and the present inventors have recognized that there is a need to improve a transitional high-load state in this kind of wireless transmission system.

According to an embodiment of the present invention, in the case in which a retransmission request is made based on a result of error-correction decoding of a data packet received and a correct data packet is determined according to the result of the error-correction decoding of the data packet received and in which the correct data packet is disassembled by a predetermined data unit and is sent to an upper layer; when the sequence number of a correctly received data packet is discontinuous with the sequence number of the data packet correctly received immediately before, after disassembling the received data packet whose sequence number is discontinuous into predetermined data units to be sent to an upper layer, the data disassembled into the data units is temporarily accumulated, and then when the missing correct data packet due to discontinuity is received, data of the packet temporarily stored is sent to the upper layer without disassembly processing.

Thus, disassembly processing for sending data to an upper layer is executed every time data is received, even in the case of temporarily storing data due to discontinuity of packet numbers.

Accordingly, with respect to the disassembly processing for sending data to an upper layer, no temporarily intensive state occurs even in the case where re-transmission processing is executed, so that a transitional high load on a processor executing the processing can be prevented, deterioration of data transmission capability can be prevented, and as a result high-speed transmission can be obtained.

In this case, since storage capacity for temporarily accumulating data is secured when an incorrect data packet is determined based on a result of an error-correction decoding of a data packet received, memory capacity is immediately secured when storage is necessary. Accordingly, processing of securing memory capacity is not required when data to be actually stored is received, and therefore a transitional high load on a processor executing the processing can be avoided to the extent, as a result, high-speed transmission can be obtained.

Further, since the processing of disassembling data by a predetermined data unit to be sent to an upper layer is processing of removing a header added to a data packet and of disassembling the data whose header is removed, there is no need to store the header in a buffer, data amount to be stored in the buffer can be reduced to the extent and memory capacity required for the buffer can be made small.

DETAILED DESCRIPTION OF THE PREFERRED EMBODIMENTS

Figure 1:
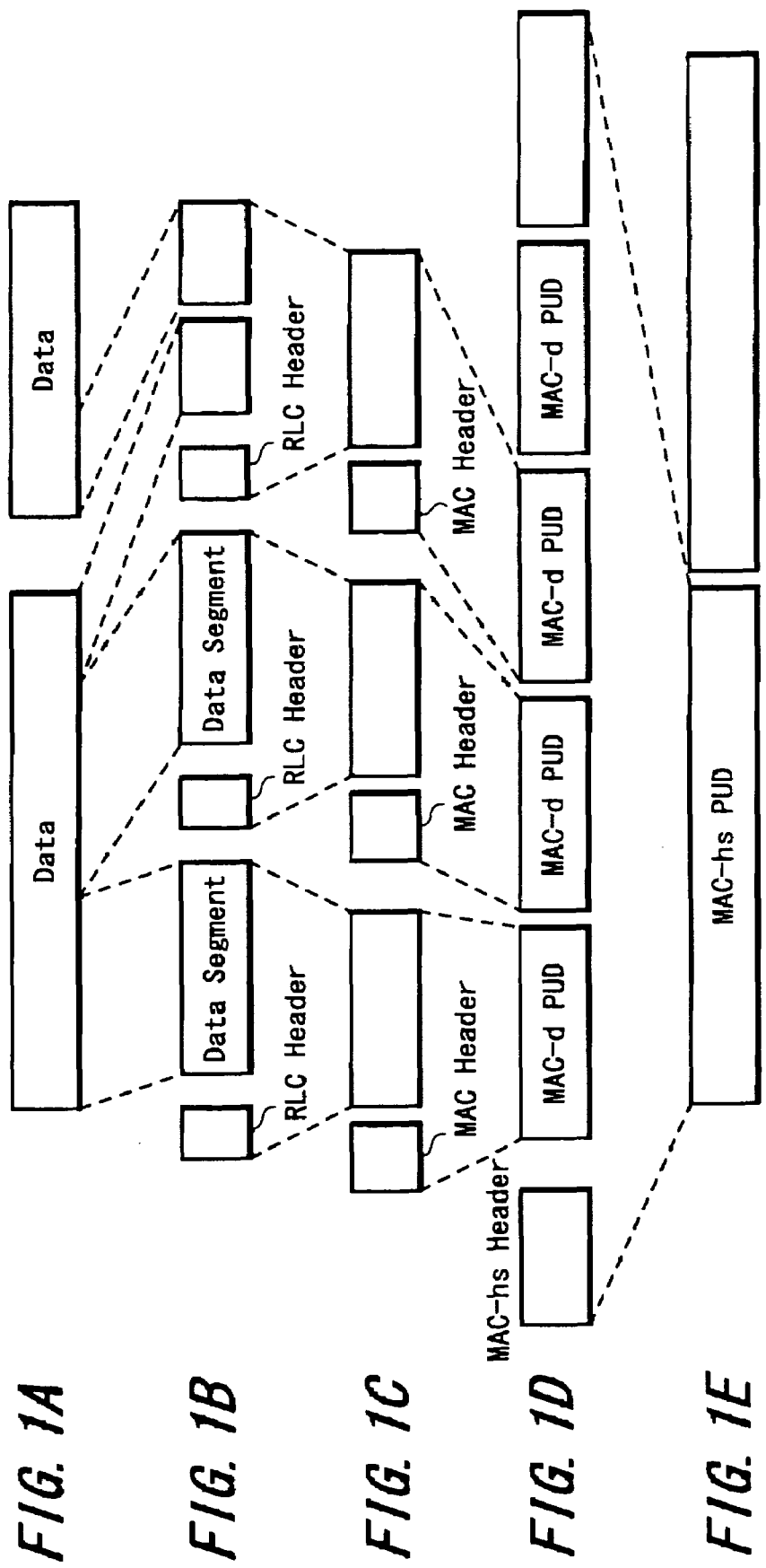
FIGS. 1A to 1E are explanatory diagrams showing relations among MAC-hs PDU, MAC-d PDU and RLC PDU.

Hereinafter, an embodiment of the present invention will be explained referring to FIGS. 4 to 8.

This embodiment is an example of a wireless data communication system to which HARQ (Hybrid ARQ) explained as related art is applied; and here UMTS (Universal Mobile Telecommunications System) that is a wireless telecommunication system to which the W-CDMA method is applied is used as the wireless communication system, in which the HSDPA (High Speed Downlink Packet Access) method enabling high-speed downlink data transmission is employed.

The HSDPA method is a method applied to high-speed downlink data transmission from a base station of a wireless telephone system to a mobile phone unit. First, an example of a configuration of a mobile phone unit (wireless communication terminal) will be explained referring to FIG. 4.

The mobile phone unit in this embodiment includes an antenna 11 connected to an RF (radio frequency) processor 12. The RF processor 12 receives a radio signal in a predetermined frequency band and wirelessly transmits a transmission signal in a predetermined frequency band. As a wireless connection method, since the W-CDMA method is employed, wireless connection based on the CDMA (Code Division Multiple Accesses) method is executed. To the RF processor 12 is connected a communication processor 13. The communication processor 13 executes demodulation of a signal received, reception data processing of data demodulated and the like, and processing of data to be transmitted, modulation for transmission and the like. In the communication processor 13, processing in an RLC layer and in each of MAC layers included in a layer structure described later on and the like are executed. Further, a buffer memory 13a necessary for processing in each layer is included. Although one memory is shown as the buffer memory 13a in FIG. 4, a plurality of memories may be provided per layer. Alternatively, a storage area of one memory may be divided to be used as the memory of each layer.

Received data and control data obtained in the communication processor 13 are supplied to a controller 14 which is controlling means to control the operation of each unit of this mobile phone unit. Received data required to accumulate is stored in a memory 15. Further, voice data for a received telephone call is supplied to a voice system circuit not shown in the figure and is output. Transmission data stored and so on in the memory 15 is sent to the communication processor 13 by the control of the controller 14, where transmission processing is executed. To the controller 14 is connected a display unit 16 where a display based on data received or the like is executed. Further, operational information from a key 17 arranged in this mobile phone unit is supplied to the controller 14, and an operation based on the key operation is performed.

Figure 5:
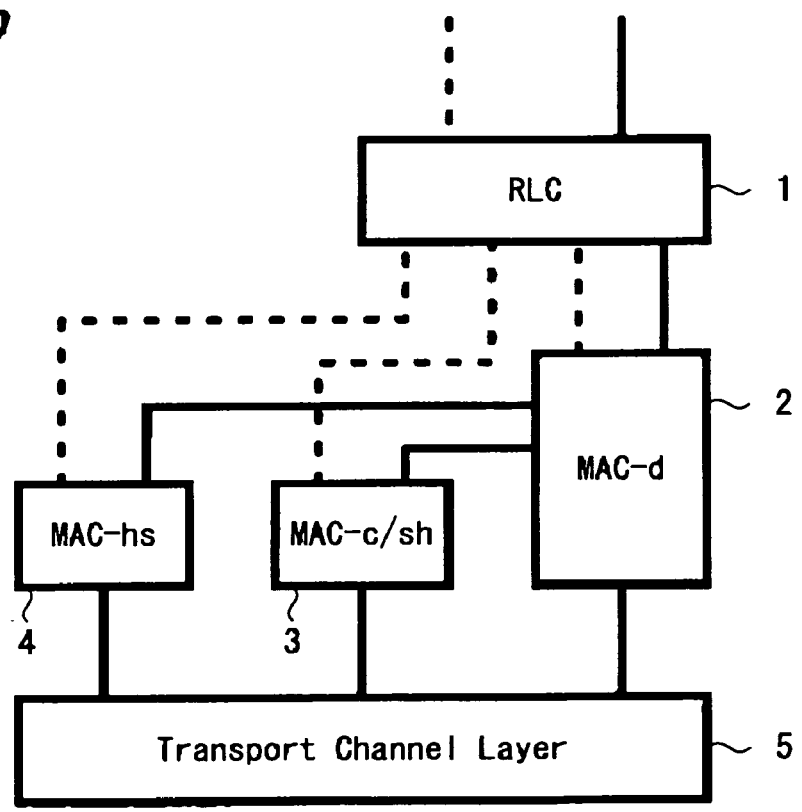
FIG. 5 is an explanatory diagram showing an example of a part of a layer structure in a UMTS terminal.

Next, referring to FIG. 5, part of a layer structure showing the processing function of the HSDPA method which is operable by including the communication processor 13 and so on in the mobile phone unit of this embodiment is explained. In FIG. 5, solid lines represent flows of data, and broken lines represent flows of control information. As shown in FIG. 5, a radio link control (hereinafter called RLC) layer 1 is provided as an upper layer to MAC layers relating to the HARQ function. As the MAC layers, a MAC-d layer 2, MAC-c/sh layer 3 and MAC-hs layer 4 are provided. In addition, a transport channel layer 5 is provided below the MAC layers.

The transport channel layer 5 has the function of receiving data from physical channels and the function of transmitting data to the physical channels. The MAC-hs layer 4 transfers MAC-hs PDUs in the HSDPA method to the MAC-d layer 2 in order. The MAC-c/sh layer 3 has the function of transferring data received in a common and shared channel to the MAC-d layer 2. The MAC-d layer 2 has the function of transferring MAC-d PDUs to the RLC layer 1. As shown by the broken lines in FIG. 5, each MAC layer exchanges control information with the RLC layer 1. Note that since the MAC-c/sh layer is not directly related to the processing of the present invention, the specific processing thereof is not explained.

Figure 4:
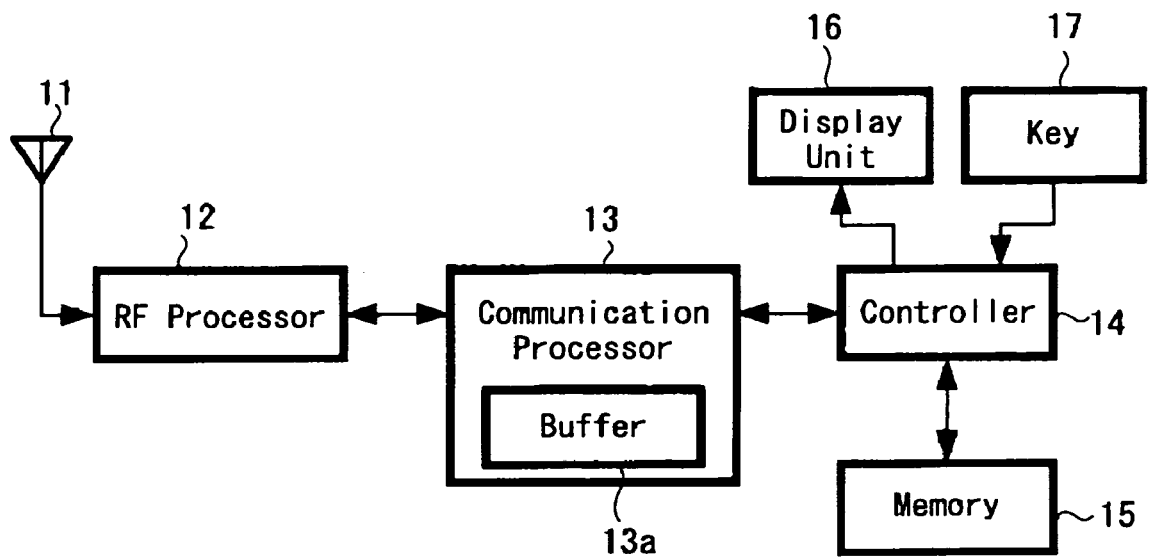
FIG. 4 is a block diagram showing an example of a configuration of a terminal according to an embodiment of the present invention.
Figure 6:
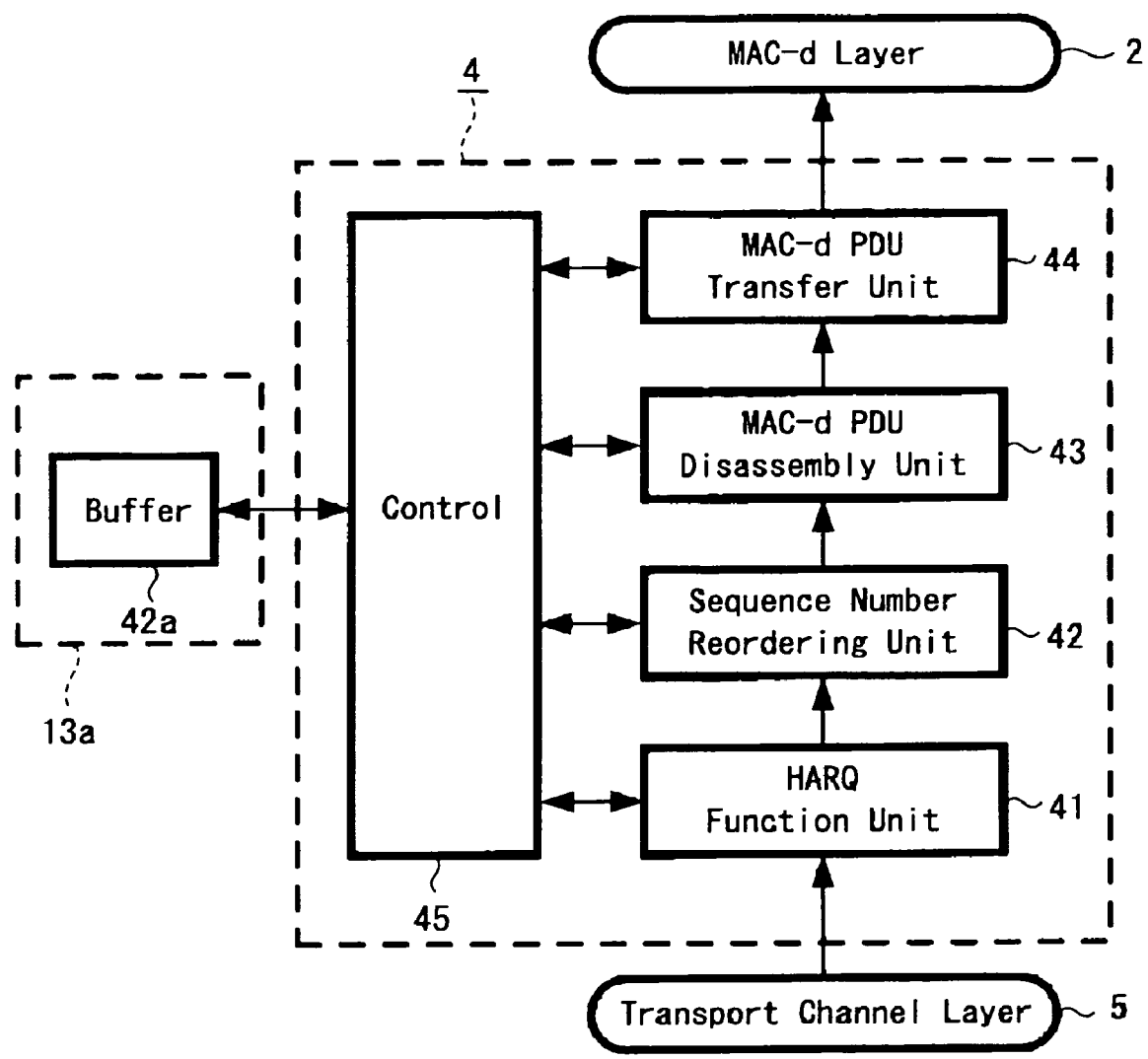
FIG. 6 is a block diagram showing an example of a structure of a MAC-hs layer according to an embodiment of the present invention.

FIG. 6 is a diagram showing an example of a configuration of the MAC-hs layer 4 of this embodiment. The structure of the MAC-hs layer 4 is explained referring to FIG. 6. A received data packets (MAC-hs PDU) supplied from the transport channel layer 5 is subjected to an error check (what is called a CRC check) using an error detecting code in a HARQ function unit 41. Processing of generating an Ack signal or a Nack signal based on a result of the error check is executed in a controller 45 which controls the processing in the MAC-hs layer 4. Part of a processor constituting the controller 14 shown in FIG. 4 is used as the controller 45, for example. Alternatively, a processor for exclusive use may be provided in the communication processor 13 shown in FIG. 4.

In the case where no error is detected in the check in the HARQ function unit 41, the received data packet is sent to a sequence number reordering unit 42. In the sequence number reordering unit 42, if the sequence numbers of packets supplied are in numerical order, those packets are sent to a MAC-d PDU disassembly unit 43 without applying any processing. In the MAC-d PDU disassembly unit 43, each of the supplied packets is disassembled into predetermined data units dealt with in a MAC-d layer which is the next layer. The disassembly processing in the disassembly unit 43 is equivalent to the processing of disassembling the MAC-hs PDU shown in FIG. 1E into the MAC-d PDUs shown in FIG. 1D. At the time of this disassembly processing, the MAC-hs header shown in FIG. 1D is removed.

The data disassembled in the disassembly unit 43 is sent to a MAC-d PDU transfer unit 44. Further, the transferred data is sent from the MAC-d PDU transfer unit 44 to the MAC-d layer 2 which is an upper layer. Processing in each of 41, 42, 43 and 44 is executed based on the control by the controller 45.

In the sequence number reordering unit 42, if the sequence number of a packet supplied is discontinuous, the packet of the discontinuous sequence number is temporarily stored in a data order reordering buffer 42a which is secured within the buffer 13a connected to a processor constituting the MAC-hs layer 4. A storage area of this buffer 42a for the temporary storage is secured by the control of the controller 45, when a packet having a data error is detected in the check of the HARQ function unit 41, for example. Then, in the sequence number reordering unit 42, the data stored and data sent from the HARQ function unit 41 are used to rearrange packets in order of the sequence number, and the result is sent to the MAC-d PDU disassembly unit 43.

In this embodiment, however, when packet data having a discontinuous sequence number is temporarily stored in the data order reordering buffer 42a, the packet data is sent to the MAC-d PDU disassembly unit 43 before being stored and MAC-hs header is removed. Subsequently, the packet data is disassembled into data units dealt with by a MAC-d layer, and the data disassembled is stored in the buffer 42a.

Further, data read from the buffer 42a is the data already disassembled, so that when sent from the sequence number reordering unit 42 to the MAC-d PDU disassembly unit 43, disassembly processing is not executed, and the data is sent to the transfer unit 44 without applying any disassembly processing and is transferred to the MAC-d layer 2.

Figure 7:
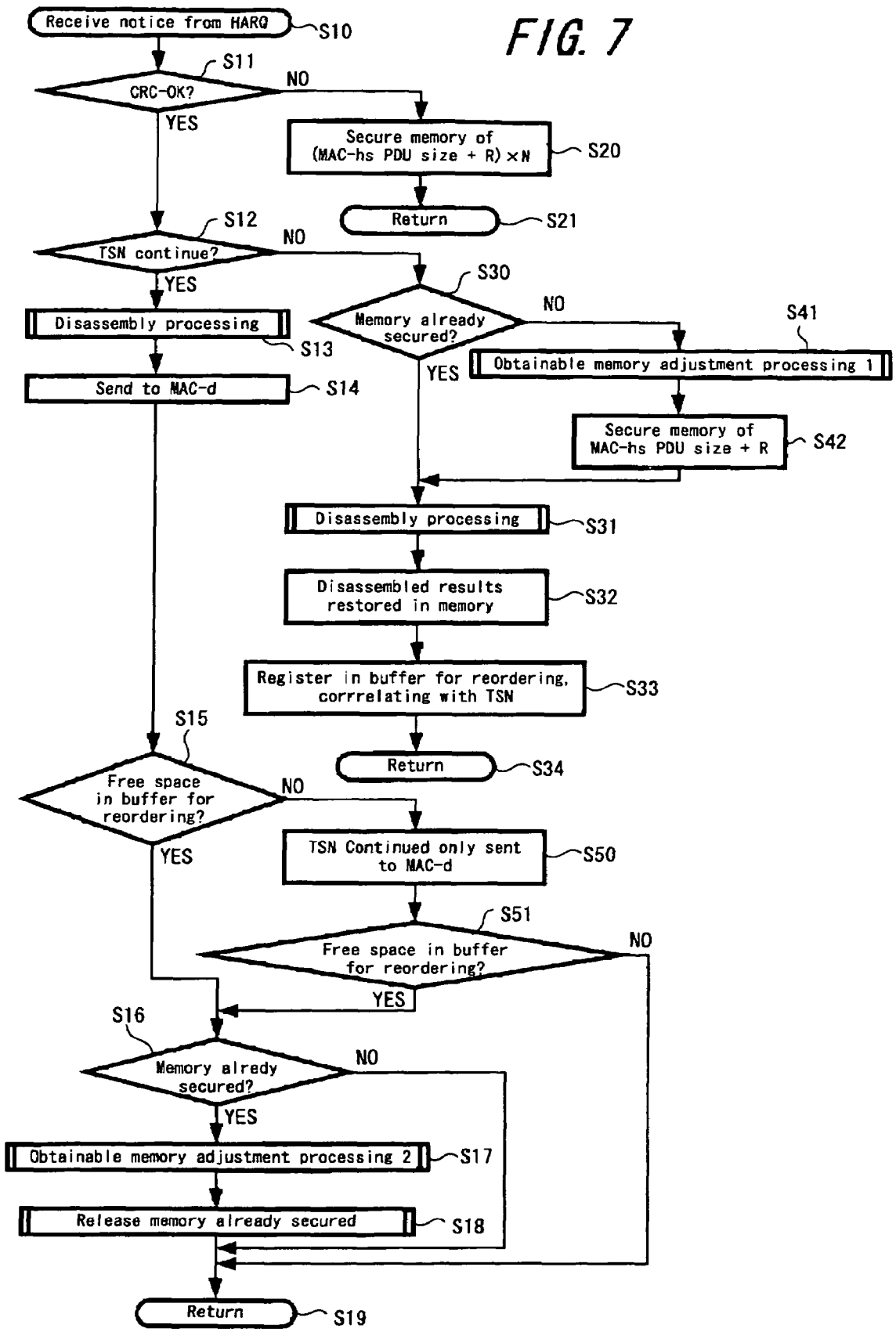
FIG. 7 is a flow chart showing an example of reception processing according to an embodiment of the present invention.

Next, an example of processing of the received data in the MAC-hs layer according to this embodiment is explained referring to the flow chart in FIG. 7. First, when receiving notice from the HARQ function unit 41 (Step S10), the controller 45 judges whether a result of a CRC check is OK or not (Step S11). Then, if the result thereof is not OK, a capacity of dynamic memory calculated by means of the expression below is secured in advance as the buffer 42a (Step S20), and the processing flow returns to Step S10, awaiting further notice. The above capacity of memory secured is expressed as follows, where R is an additional size in which surplus bits after disassembly processing is taken into consideration, and N is the number of delays estimated of MAC-hs packets per CRC-NG:

(MAC-hs PDU size+R)×N

In addition, the additional size R in which surplus bits after disassembly processing is taken into consideration is, for example, defined as MAC-d PDU number capable of being included in a unit of MAC-hs PDU×1 byte. This is a size with which to absorb fractional bits less than a boundary of 8 bits generated when an MAC-hs PDU is disassembled into MAC-d PDUs.

In Step S11, if the result of the CRC check is OK, the controller 45 judges whether a packet supplied has a continuous sequence number or not (Step S12). If the number is not continuous, whether a storage area of memory has already been secured or not is judged (Step S30). In the case where the storage area has not been secured, obtainable memory adjustment processing is executed (Step S41), and memory to the amount of MAC-hs PDU size+R is secured as the buffer 42a (Step S42). Regarding the obtainable memory adjustment processing in Step S41, since it is assumed that, for example, a memory capacity already obtained is insufficient, the above-described value of N in the case in which this processing occurs H times continuously is incremented by 1.

In the case where it is judged in Step S30 that there is memory secured and in the case where memory is secured in Step S42, the controller makes the MAC-hs PDU supplied on the occasion disassembled into MAC-d PDUs (Step S31). Subsequently, the disassembled data is returned to the secured buffer 42a to be stored therein (Step S32). Then, the data is associated with the sequence number (TSN) and is registered in the buffer 42a (Step S33), and the processing flow returns to Step 10, awaiting further notice.

In the case where the sequence number is continuous in Step S12, the MAC-hs PDU supplied on that occasion is disassembled into MAC-d PDUs (Step S13), and the data disassembled is sent to an MAC-d layer (Step S14). After that, whether or not there is space in the reordering buffer 42a is judged (Step S15). If there is no space, only data of the continuous sequence number is sent to the MAC-d layer (Step S50). Subsequently, whether or not there is space in the reordering buffer 42a is judged (Step S51), and if there is no space, then the processing flow returns to Step S10, awaiting further notice (Step S19).

In the case where it is judged in Step S15 that there is space, and in the case where it is judged in Step S51 that there is space, the controller 45 judges whether or not there is unused memory already secured as the buffer 42a (Step S16). If there is no unused memory, the processing flow returns to Step S10, awaiting further notice (Step S19).

Further, in the case where there is unused memory already secured in Step S16, the controller 45 executes obtainable memory adjustment processing (Step S17). Subsequently, memory already secured is released (Step S18), and the processing flow returns to Step S10, awaiting further notice (Step S19). Regarding the obtainable memory adjustment processing in Step S17, since it is assumed that, for example, a capacity of memory obtained is excessive, 1 is subtracted from the above-described value N in the case in which this processing occurs H times continuously.

Figure 2:
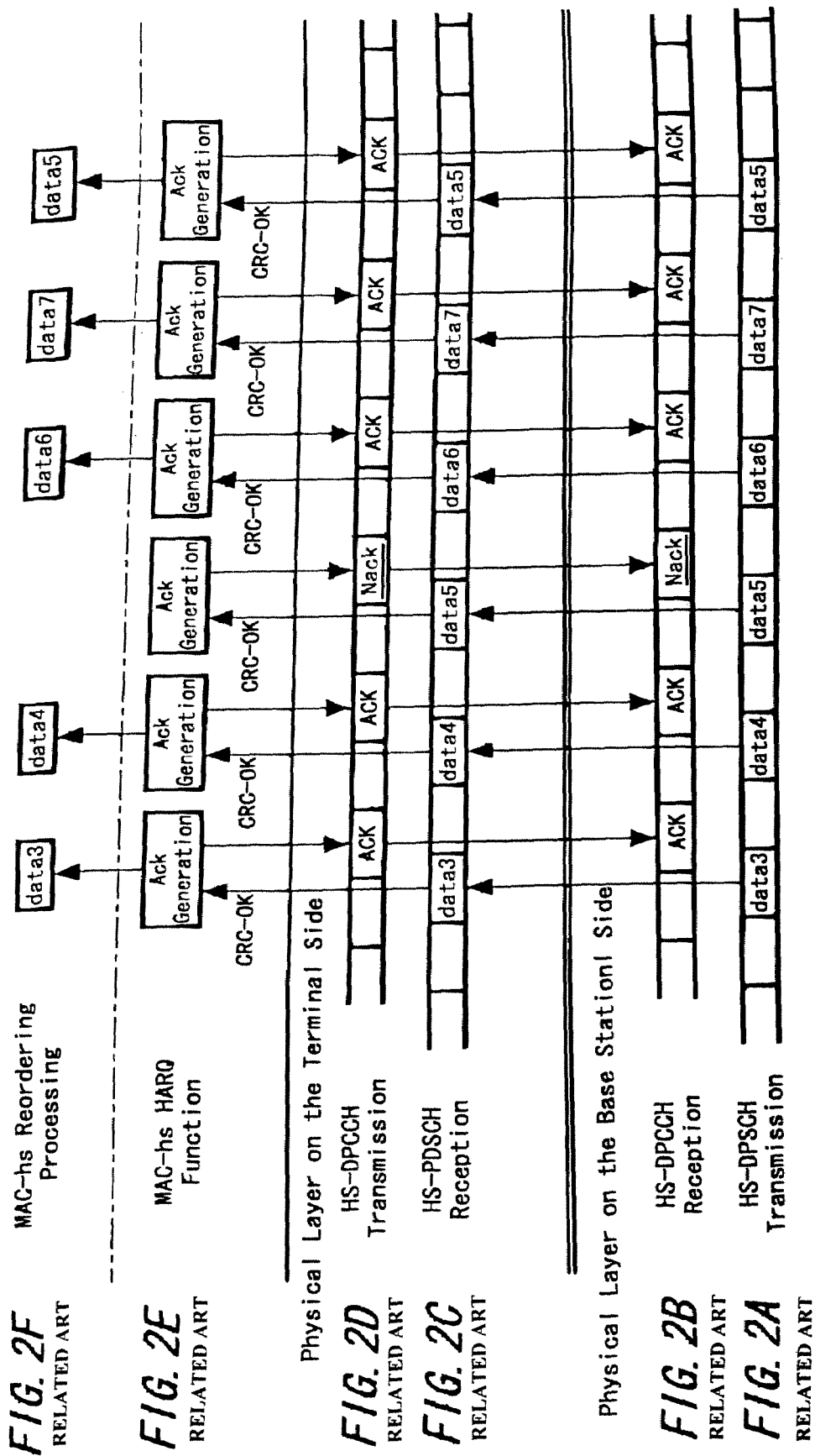
FIGS. 2A to 2F are timing diagrams showing an example of data transmission in related art.
Figure 3:
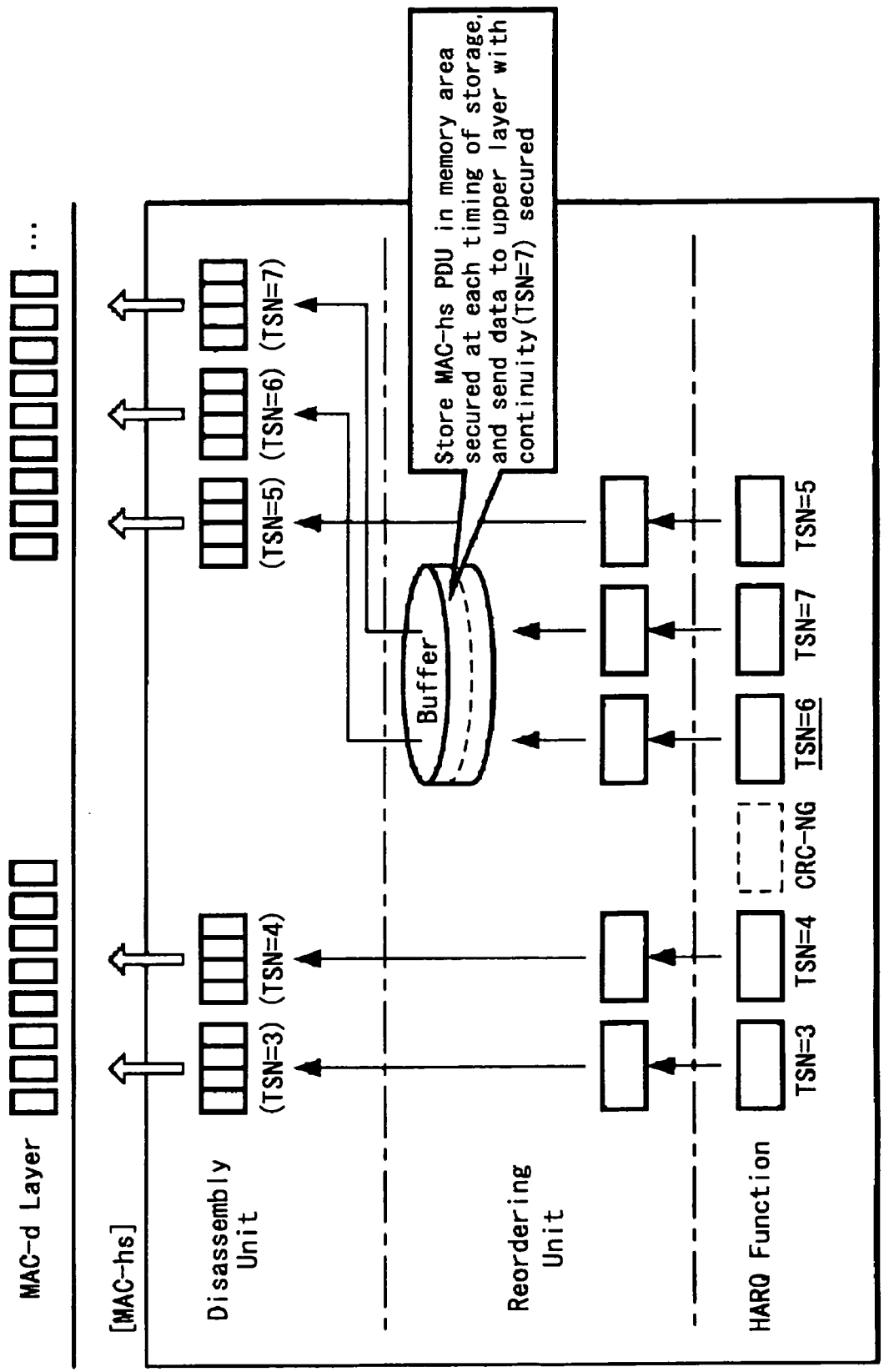
FIG. 3 is an explanatory diagram showing an example of a state of reception processing in related art.
Figure 8:
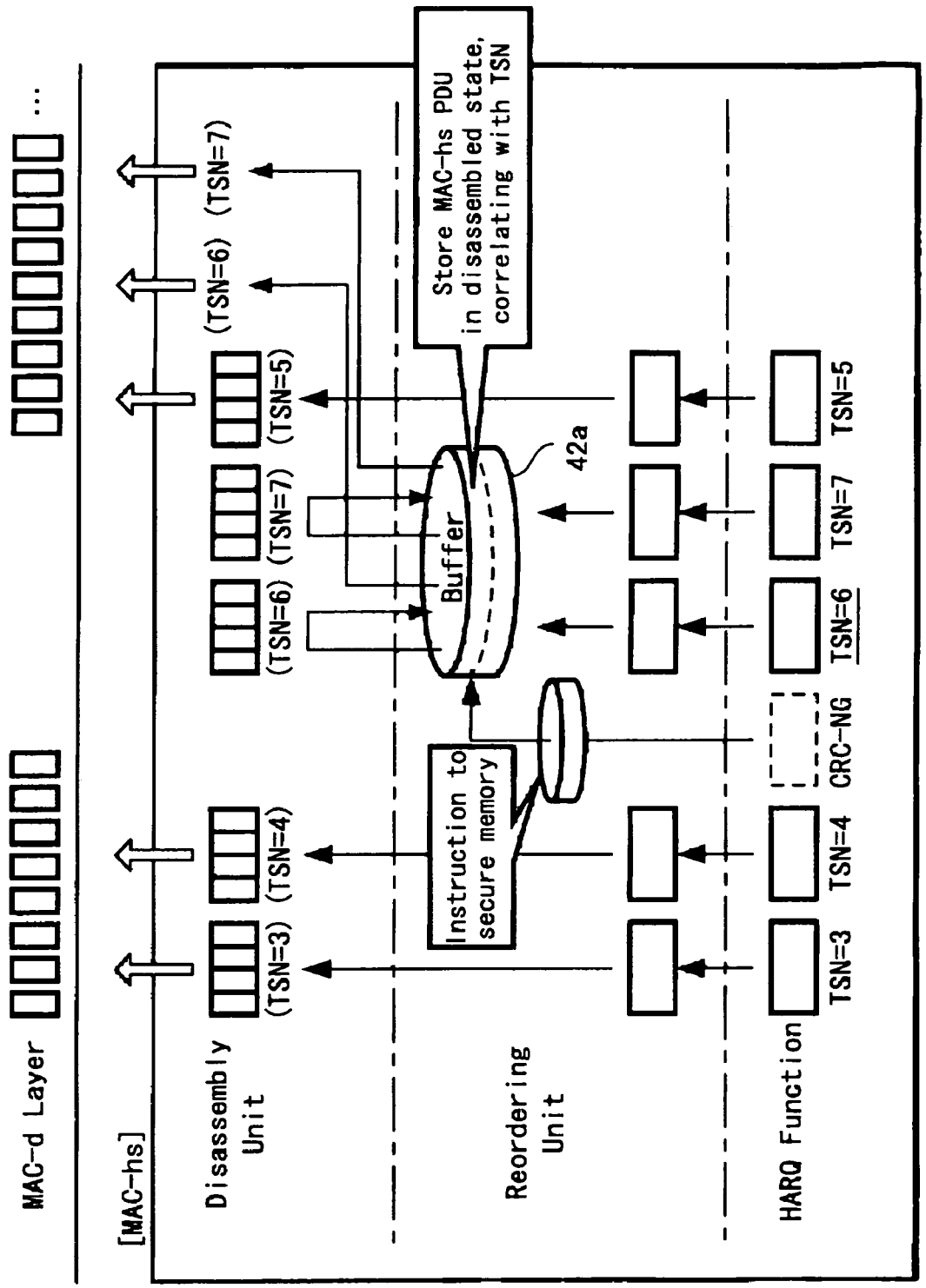
FIG. 8 is an explanatory diagram showing an example of a state of reception processing according to an embodiment of the present invention.

FIG. 8 is a diagram showing on a time line an example of processing in respective functional units within the MAC-hs layer of this embodiment. FIG. 8 shows an example of processing in this embodiment, corresponding to the case in which a reception error occurs in the packet of TSN=5 shown in FIG. 2 explained in related art.

The processing according to this embodiment shown in FIG. 8 is explained. As long as a correct received packet continues to be detected in a HARQ function unit shown at the bottom of FIG. 8, no rearrangement processing is executed in a reordering unit and the received packet is sent to a disassembly unit without any processing performed. In the disassembly unit, the received packet is disassembled and is sent to a MAC-d layer, which is the next (upper) layer. Specifically, the packets of TSN=3, 4, for example, are directly sent to the disassembly unit to be disassembled and are sent to the MAC-d layer.

Hereupon, when an error is detected in the packet of TSN=5 in the CRC check, instruction to secure a memory area as the reordering buffer 42*a* is given, and packets correctly received thereafter are stored in the reordering buffer 42*a* until the packet of TSN=5 is re-transmitted. On this occasion, the data stored in the reordering buffer 42*a* is stored in the memory as data disassembled into MAC-d PDUs. Specifically, the MAC-hs PDUs of TSN=6, 7 are disassembled into MAC-d PDUs to be accumulated and then temporarily stored in a buffer.

Then, when the packet of TSN=5 is re-transmitted, the packets of TSN=6, 7 are read from the memory subsequently to the packet of TSN=5 and those packets are sent to the disassembly unit as the packets in correct order. Subsequently, the packets are sent to the MAC-d layer. On this occasion, having already been disassembled into MAC-d packets, the data read from the buffer 42*a* is sent to the MAC-d layer without disassembly processing being applied in the disassembly unit.

With the processing as described above, received data without an error is supplied to the MAC-d layer in correct order. Further in this embodiment, even if received data is temporarily stored in the MAC-hs layer due to a discontinuous packet number, disassembly processing for sending data to an upper layer is executed every time data is received, so that temporarily intensive disassembly processing can be prevented, even if re-transmission processing is executed. Therefore, at the time of re-transmission processing, a transitional high load on a processor can be avoided; the deterioration of data-transmitting capability can be prevented; and consequently, high-speed transmission can be obtained.

Furthermore, in this embodiment, a storage capacity of the buffer for temporarily accumulating data in the MAC-hs layer is secured when an incorrect data packet is determined based on a result of an error-correction decoding of a data packet received. That is, memory capacity is immediately secured as soon as storage is necessary and there is no need to execute processing of securing the memory capacity when data to be actually stored is received, so that a transitional high load on a processor executing the processing can also be avoided to the extent, as a result enabling high-speed transmission.

Further, since data temporarily stored in the MAC-hs layer is stored after removing a header attached to a data packet, there is no need to store the header in the buffer, and the amount of data stored in the buffer can be reduced to that amount, so that only a small capacity is required as the buffer.

Furthermore, the above-mentioned embodiment is an example in which the present invention is applied to the HSDPA method in UMTS system that is a wireless telecommunication system to which the W-CDMA method is applied and high-speed data transmission is executed from a base station to a terminal by means of the HARQ technology; however, needless to say the present invention can be applied to other methods of wireless data transmission. The present invention can be applied to other wireless data communication of various methods than wireless telecommunication as long as a method basically uses HARQ technology to perform re-transmission request based on the result of error correction decoding of the data packet received and to perform transmission.

It should be understood by those skilled in the art that various modifications, combinations, sub-combinations and alterations may occur depending on design requirements and other factors insofar as they are within the scope of the appended claims or the equivalents thereof.

What is claimed is:

1. A re-transmission controlling method comprising:
   an error-correction decoding step of executing the error-correction decoding on a data packet received;
   an error-judging step of judging whether said received data packet on which the error-correction decoding is executed has correctly been received or not;
   a re-transmission request step of making a re-transmission request, in the case where it is judged in said error-judging step that said received data packet has not been received correctly;
   a continuity-judging step of judging whether or not said received data packet is next in a sequence with a previously-received data packet that was judged to be correctly received, in the case where said received data packet is judged in said error-judging step to be received correctly;
   a disassembly step of disassembling said received data packet into predetermined data units;
   a transmission step of sending data disassembled into predetermined data units in said disassembly step to an upper layer, in the case where it is judged in said continuity-judging step that said received data packet is in sequence; and
   a temporary storage step of temporarily storing data disassembled into predetermined data units in said disassembly step, in the case where it is judged in said continuity-judging step that said received data packet is not in sequence,
   wherein a storage capacity used for temporarily accumulating data in said temporary storage step is secured when it is judged in said error-judging step that said received data packet has not been correctly received.

2. The re-transmission controlling method according to claim 1, further comprising the steps of:
   in the case where a data packet again received based on the re-transmission request in said re-transmission request step has been judged to be correctly received in said error-judging step, and the data packet again received is in sequence with data stored in said temporary storage step;
   disassembling the data packet again received into predetermined data units, and
   sending the data packet along with said temporarily stored data to an upper layer.

3. The re-transmission controlling method according to claim 1, wherein said disassembly step is processing of removing a header added to said data packet received and of disassembling data from which the header is removed into predetermined data units.

4. A wireless communication terminal comprising:
   error-correction decoding means to execute the error-correction decoding on a received data packet;

error-judging means to judge whether said received data packet on which the error-correction decoding is executed has correctly been received or not;

re-transmission request means to make a re-transmission request, in the case where it is judged in said error-judging means that said received data packet has not been received correctly;

continuity-judging means to judge whether or not said received data packet is next in a sequence with a previously-received data packet before the data packet and that was judged to be correctly received, in the case where the said received data packet is judged in said error-judging means to be correctly received;

disassembly means to disassemble said received data packet into predetermined data units;

transmission means to send data disassembled into predetermined data units in said disassembly means to an upper layer, in the case where it is judged in said continuity-judging means that said received data packet is in sequence; and temporary storage means to temporarily store data disassembled into predetermined data units in said disassembly means, in the case where it is judged in said continuity-judging means that said received data packet is out of sequence discontinuous, wherein a storage capacity used for temporarily accumulating data in said temporary storage means is secured when it is judged in said error-judging means that said received data packet received has not been correctly received.

5. The wireless communication terminal according to claim 4, wherein in the case where a data packet again received based on the re-transmission request from said re-transmission request means has been judged in said error-judging means to be correctly received, and the data packet again received is in sequence with data stored in said temporary storage means;

the data packet again received is disassembled into predetermined data units in disassembly means and is sent to an upper layer along with said temporary stored data.

6. The wireless communication terminal according to claim 4, wherein said disassembly means removes a header added to said data packet received and disassembles data from which the header is removed into predetermined data units.

7. A wireless communication terminal comprising:

an error-correction decoding unit executing the error-correction decoding on a received data packet;

an error-judging unit judging whether said received data packet on which the error-correction decoding is executed has correctly been received or not;

a re-transmission request unit making a re-transmission request, in the case where it is judged in said error-judging unit that said received data packet has not been received correctly;

a continuity-judging unit judging whether or not said received data packet is next in a sequence with a previously-received data packet that was judged to be correctly received, in the case where said received data packet received is judged in said error-judging unit to be correctly received;

a disassembly unit disassembling said received data packet into predetermined data units;

a transmission unit sending data disassembled into predetermined data units in said disassembly unit to an upper layer, in the case where it is judged in said continuity-judging unit that said received data packet is in sequence; and a temporary storage unit temporarily storing data disassembled into predetermined data units in said disassembly unit, in the case where it is judged in said continuity-judging unit that said received data packet is out of sequence discontinuous, wherein a storage capacity used for temporarily accumulating data in said temporary storage unit is secured when it is judged in said error-judging unit that said received data packet has not been correctly received.

* * * * *